(12) United States Patent
Miyashita

(10) Patent No.: US 8,091,318 B2
(45) Date of Patent: Jan. 10, 2012

(54) FORMED PART FOR VEHICLE BODY STRUCTURAL MEMBER

(75) Inventor: Toshiya Miyashita, Northville, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 27 days.

(21) Appl. No.: 12/676,479

(22) PCT Filed: Sep. 1, 2008

(86) PCT No.: PCT/IB2008/002258
§ 371 (c)(1),
(2), (4) Date: Mar. 4, 2010

(87) PCT Pub. No.: WO2009/037537
PCT Pub. Date: Mar. 26, 2009

(65) Prior Publication Data
US 2010/0201158 A1   Aug. 12, 2010

(30) Foreign Application Priority Data
Sep. 21, 2007 (JP) .................................. 2007-246155

(51) Int. Cl.
*E04C 3/00* (2006.01)
(52) U.S. Cl. ...................... 52/846; 296/203.01; 296/210
(58) Field of Classification Search .................... 52/831, 52/836, 846, 850, 851, 856; 296/203.01, 296/203.03, 210, 102, 187.01
See application file for complete search history.

(56) References Cited

U.S. PATENT DOCUMENTS

| 5,048,345 | A | 9/1991 | Hagiwara et al. |
| 5,570,558 | A * | 11/1996 | Persson ....................... 296/146.6 |
| 6,578,909 | B1 * | 6/2003 | Reed et al. ..................... 296/210 |
| 2006/0202520 | A1 * | 9/2006 | Osterberg et al. ............. 296/210 |
| 2007/0119648 | A1 * | 5/2007 | Udo et al. ....................... 180/379 |
| 2007/0200314 | A1 * | 8/2007 | Anderson et al. ............. 280/210 |

FOREIGN PATENT DOCUMENTS

| EP | 1 329 375 A2 | 7/2003 |
| JP | U 5-46522 | 6/1993 |

(Continued)

OTHER PUBLICATIONS

International Search Report issued in corresponding International Patent Application No. PCT/IB2008/002258, mailed Feb. 3, 2009.

(Continued)

*Primary Examiner* — Brian Glessner
*Assistant Examiner* — Brian D Mattei
(74) *Attorney, Agent, or Firm* — Oliff & Berridge, PLC

(57) ABSTRACT

Curved portions are formed on a first vertical wall portion that continues from a headwall portion and curved portions are formed on a second vertical wall portion that continues from the headwall portion. A difference in the linear length on the first vertical wall portion side before forming and after forming is cancelled out (i.e., absorbed) by the sum of the amounts that the curved portions protrude. Similarly, a difference in the linear length on the second vertical wall portion side before forming and after forming is cancelled out (i.e., absorbed) by the sum of the amounts that the curved portions protrude. As a result, tensile stress on the first vertical wall portion side and compression stress on the second vertical wall portion side can be prevented or minimized.

20 Claims, 11 Drawing Sheets

FOREIGN PATENT DOCUMENTS

| | | |
|---|---|---|
| JP | A-07 171 625 | 7/1995 |
| JP | A 2004-322666 | 11/2004 |
| JP | A 2005-096634 | 4/2005 |
| JP | A 2006-069282 | 3/2006 |
| JP | A 2006-281312 | 10/2006 |
| JP | A 2006-321491 | 11/2006 |
| KR | 2003 0067344 | 8/2003 |

OTHER PUBLICATIONS

Written Opinion of the International Searching Authority issued in corresponding International Patent Application No. PCT/IB2008/002258, mailed Feb. 3, 2009.

Office Action dated Oct. 17, 2011 issued in Korean Patent Application No. 2010-7006103 (with translation).

* cited by examiner

FORMED PART FOR VEHICLE BODY STRUCTURAL MEMBER

BACKGROUND OF THE INVENTION

1. Field of the Invention

The invention relates to a formed part for a vehicle body structural member that makes up part of a vehicle body. More particularly, the invention relates to a formed part for a vehicle body structural member, which is formed from a so-called high strength steel sheet which has a higher tensile strength than does a normal steel sheet, or a so-called ultra high strength steel sheet which has an even higher tensile strength than does a high strength steel sheet.

2. Description of the Related Art

Some vehicle body structural members such as roof side rail outer reinforcements provided along the roof side of a vehicle body, and center pillar upper reinforcements and center pillar lower reinforcements provided along the center pillar of the vehicle body are used which have hat-shaped cross-sections that open in the vehicle width direction. Moreover, such vehicle body structural members having this kind of structure are formed by drawing (i.e., press-forming) sheets of steel (Japanese Patent Application Publication No. 2006-281312 (JP-A-2006-281312) describes one such example).

In recent years, these kinds of vehicle body structural members are being made of so-called high strength steel sheets which have a higher tensile strength than normal steel sheets. Further, ultra high strength steel which has an even higher tensile strength than a high strength steel sheet also is being considered for making such vehicle body structural members.

On the other hand, roof sides are often curved downward at the front so that the front is lower than the center in the longitudinal direction of the vehicle. When a roof side rail outer reinforcement having a hat-shaped cross-section is formed following that shape, the entire roof side rail outer reinforcement curves so that the center of curvature is positioned on one side in the width direction of the headwall portion (i.e., referred to as the hat-shaped head section in JP-A-2006-281312).

When a flat sheet of steel is drawn (press-formed), the linear length in the longitudinal direction of the headwall portion is different before and after forming at a vertical wall portion formed continuous from the edge portion in the width direction of the headwall portion. This difference in linear length (also hereinafter referred to as "linear length difference") results in tensile stress in the longitudinal direction of the headwall at the vertical wall portion on a first side of the headwall portion in the width direction (i.e., on the side on which the center of curvature of the curve is located). In addition and conversely, compression stress in the longitudinal direction of the headwall is generated in the vertical wall portion on a second side of the headwall portion in the width direction (i.e., on the side opposite the side on which the center of curvature of the curve is located). When this stress is generated in the vertical wall portion, it causes the vertical wall portion to lean and twist above its axis which lies in the longitudinal direction of the head wall portion.

This kind of twisting is significant when high strength steel sheets, which have a higher tensile strength than normal steel sheets, are used, and even more significant when ultra high strength steel sheets, which have an even higher tensile strength than high strength steel sheets, are used, making it difficult to obtain the desired shape.

SUMMARY OF THE INVENTION

This invention thus provides a formed part for a vehicle body structural member in which there is little or no unnecessary deformation caused by stress from a difference in the linear length before and after forming.

A first aspect of the invention relates to a formed part for a vehicle body structural member, which includes a first wall portion, a second wall portion, a third wall portion, and a linear length difference absorbing portion. The first wall portion is plate-shaped. The first wall portion extending in a longitudinal direction and in a width direction orthogonal to the longitudinal direction and having two edge portions on opposite sides of the first wall portion in the width direction, at least one of the edge portions is curved such that a center of curvature of the edge portion is positioned on a first side in the width direction. The second wall portion is formed so as to i) extend from the at least one edge portion of the first wall portion toward one side in the direction of thickness of the first wall portion, and ii) curve along with the edge portion in the width direction of the first wall portion. The third wall portion is plate-shaped and extends from an edge portion of the second wall portion that is opposite the edge portion of the second wall portion which is continuous with the first wall portion, toward an outside in the width direction of the first wall portion. The linear length difference absorbing portion is formed on the second wall portion by bending or curving a portion of the second wall portion in a direction of thickness of the second wall portion.

With the formed part according to this first aspect, the second wall portion is formed extending from at least one edge portion of the plate-shaped first wall portion, toward one side in the direction of thickness of the first wall portion. Moreover, the third wall portion is formed extending from the edge portion of the second wall portion which is opposite the edge portion of the second wall portion which is continuous with the first wall portion toward the outside in the width direction of the first wall portion (more specifically, toward the outside in the width direction of the first wall portion from the edge portion in the width direction of the first wall portion on the side where the second wall portion is formed).

Moreover, the edge portion in the width direction of the first wall portion which is continuous with the second wall portion is curved such that the center of curvature is positioned on the first side in the width direction of the first wall portion, and the second wall portion is curved following this edge portion in the width direction of the first wall portion.

With this formed part, the linear length difference absorbing portion is formed on the second wall portion. This linear length difference absorbing portion is formed by bending or curving a portion of the second wall portion in the direction of thickness of the second wall portion. By forming the linear length difference absorbing portion on the second wall portion, the linear length difference at the second wall portion in the longitudinal direction of the first wall portion before and after forming the first, second, and third wall portions, i.e., before and after forming the formed part, can be absorbed by the linear length difference absorbing portion. As a result, unnecessary deformation from a stress difference or the like caused by this linear length difference can be prevented or effectively minimized.

According to the foregoing first aspect, the linear length difference before and after forming is absorbed by the linear length difference absorbing portion so unnecessary deformation from a stress difference or the like caused by a linear length difference can be prevented or effectively minimized.

In the first aspect described above, the second wall portion may be at least one of a pair of vertical wall portions extends from the two edge portions of the first wall portion toward one side in the direction of thickness of the first wall portion, and on which a flange portion is formed extending from the edge portion of the second wall portion that is opposite the edge portion that is continuous with the first wall portion; and the third wall portion may be the flange portion.

With the formed part having this structure, the vertical walls extend from separate edges in the width direction of the first wall portion toward one side in the direction of thickness of the first wall portion. Furthermore, the flange portion extends from the edge portions of these vertical wall portions that are opposite the first wall portion, toward the outside in the width direction of the first wall portion. That is, the formed part is shaped such that its overall sectional shape when cut in the width direction of the first vertical wall portion is so-called hat-shaped.

Moreover, with the formed part having the structure described above, the edge portion in the width direction of the first wall portion (i.e., the edge portion on at least one side in the width direction) is curved such that the center of curvature of that edge portion is on a first side in the width direction. Therefore, the vertical wall corresponding to the curved edge portion is the second wall portion and curves along with the edge portion in the width direction of the first wall portion. The flange portion that is formed on the vertical wall portion which is this second wall portion is the third wall portion.

That is, the formed part having the structure described above has a hat-shaped cross-section with at least one of the two vertical wall portions being formed in a curved shape such that the center of curvature lies on the first side in the width direction of the first wall portion. However, with this formed part, the linear length difference absorbing portion is formed on the vertical wall portion that is the second wall portion so even if the formed part has a hat-shaped cross-section and at least one of the two vertical wall portions is formed in a curved shape such that the center of curvature lies on the first side in the width direction of the first wall portion, the linear length difference in the vertical wall portion, which is the second wall portion, in the longitudinal direction of the first wall portion before and after forming can be absorbed by this linear length difference absorbing portion. As a result, unnecessary deformation from a stress difference or the like caused by this linear length difference can be prevented or effectively minimized.

According to the foregoing structure, the formed part has a hat-shaped cross-section and at least one of the two vertical wall portions in the width direction of the first wall portion is formed in a curved shape such that the center of curvature lies on the first side in the width direction of the first wall portion. However, because the linear length difference before and after forming is absorbed by the linear length difference absorbing portion, unnecessary deformation from a stress difference or the like caused by this linear length difference can be prevented or effectively minimized.

In the foregoing aspect, the edge portion on the first side in the width direction of the first wall portion may be curved such that a center of curvature of the edge portion is positioned on the first side in the width direction of the first wall portion, and an amount of deformation in the linear length difference absorbing portion in the direction of thickness of the second wall portion may be made greater on the first wall portion side of the second wall portion than on the third wall portion side of the second wall portion.

According to this structure, the edge portion on the first side in the width direction of the first wall portion is curved such that the center of curvature of that edge portion is positioned on the first side in the width direction of the first wall portion. Moreover, the second wall portion that is formed extending from this edge portion on the first side in the width direction of the first wall portion is curved following the edge portion on the first side in the width direction of the first wall portion.

With such a curved formed part, the linear length difference absorbing portion is formed on the second wall portion, and the amount of deformation of the linear length difference absorbing portion in the direction of thickness of the second wall portion is larger on the first wall portion side of the second wall portion than it is on the third wall portion side of the second wall portion. Therefore, the linear length difference at the second wall portion in the longitudinal direction of the first wall portion before and after forming can be effectively absorbed by the linear length difference absorbing portion. As a result, unnecessary deformation from a stress difference or the like caused by this linear length difference can be prevented or effectively minimized.

According to this structure, the linear length difference before and after forming at the second wall portion along the edge portion in the width direction of the first wall portion that is on the same side as the center of curvature can be effectively absorbed by the linear length difference absorbing portion. As a result, unnecessary deformation from a stress difference or the like caused by this linear length difference can be prevented or effectively minimized.

In the foregoing aspect, the edge portion on the second side in the width direction of the first wall portion may be curved such that a center of curvature of the edge portion is positioned on the first side in the width direction of the first wall portion, and an amount of deformation in the linear length difference absorbing portion in the direction of thickness of the second wall portion may be made greater on the third wall portion side of the second wall portion than on the first wall portion side of the second wall portion.

According to this structure, the edge portion on the second side in the width direction of the first wall portion (i.e., the edge portion in the width direction of the first wall portion that is on the side opposite the side on which the center of curvature lies) is curved such that the center of curvature of that edge portion is on the first side in the width direction of the first wall portion. Further, the second wall portion that is formed extending from this edge portion on the second side in the width direction of the first wall portion curves along with the edge portion on the second side in the width direction of the first wall portion.

With this kind of curved formed part, the linear length difference absorbing portion is formed on the second wall portion, and the amount of deformation of the linear length difference absorbing portion in the direction of thickness of the second wall portion is larger on the third wall portion side of the second wall portion than it is on the first wall portion side of the second wall portion. Therefore, the linear length difference at the second wall portion in the longitudinal direction of the first wall portion before and after forming can be effectively absorbed by the linear length difference absorbing portion. As a result, unnecessary deformation from a stress difference or the like caused by this linear length difference can be prevented or effectively minimized.

According to this structure, the linear length difference before and after forming at the second wall portion along the edge portion in the width direction of the first wall portion that is on the same side as the center of curvature can be effectively absorbed by the linear length difference absorbing portion. As a result, unnecessary deformation from a stress difference or the like caused by this linear length difference can be prevented or effectively minimized.

In the foregoing aspect, the linear length difference absorbing portion may be formed by bending a portion of the second wall portion in the direction of thickness of the second wall portion, and a bend line portion of the bend may be linear.

In the foregoing aspect, the second wall portion may form the linear length difference absorbing portion by making the edge portion side of the first wall portion wavy.

In the foregoing aspect, the linear length difference absorbing portion may extend from the edge portion of the second wall portion on the first wall portion side toward the edge portion of the second wall portion on the third wall portion side, while slanting in the longitudinal direction of the second wall portion. Also, the linear length difference absorbing portion may extend from the edge portion of the second wall portion on the first wall portion side toward the edge portion of the second wall portion on the third wall portion side in the width direction of the second wall portion.

In the foregoing aspect, a thickness of a portion of the linear length difference absorbing portion that protrudes from the second wall portion may be less than the thickness of the second wall portion. Also, the second wall portion may include i) a step portion that is continuous with an edge portion of the linear length difference absorbing portion which protrudes in the direction of thickness of the second wall portion, and ii) a main body portion that is continuous with an edge portion of the linear length difference absorbing portion which is opposite the edge portion that is continuous with the step portion; and the main body portion and the step portion may be continuous with one another in the longitudinal direction between respective thickness centerlines of the main body portion and of the step portion, in the direction of thickness of the second wall portion.

A second aspect of the invention relates to a formed part for a vehicle body structural member, which includes a headwall portion, a first vertical wall portion, a first flange portion, a second vertical wall portion, a second flange portion, a first linear length difference absorbing portion, and a second linear length difference absorbing portion. The headwall portion is plate-shaped. The headwall portion extending in a longitudinal direction and in a width direction orthogonal to the longitudinal direction and having a first edge portion on one side in the width direction which is curved such that a center of curvature of the first edge portion is positioned on a first side in the width. The first vertical wall portion is formed so as i) extend from the first edge portion toward one side in a direction of thickness of the headwall portion, and ii) curve, with a center of curvature positioned on the first side in the width direction of the headwall portion, along with the first edge portion. The first flange portion extends from an edge portion of the first vertical wall portion which is opposite an edge portion of the first vertical wall portion which is continuous with the headwall portion, toward an outside in the width direction of the headwall portion. The second vertical wall portion is formed so as to i) extend from a second edge portion on a second side in the width direction of the headwall portion toward one side in the direction of thickness of the headwall portion, and ii) curve, with a center of curvature positioned on the first side in the width direction of the headwall portion, along with the second edge portion. The second flange portion extends from an edge portion of the second vertical wall portion which is opposite an edge portion of the second vertical wall portion which is continuous with the headwall portion, toward an outside in the width direction of the headwall portion. The first linear length difference absorbing portion is formed on the first vertical wall portion by bending or curving a portion of the first vertical wall portion in a direction of thickness of the first vertical wall portion, such that an amount of deformation becomes greater on the headwall portion side than on the first flange portion side. The second linear length difference absorbing portion is formed on the second vertical wall portion by bending or curving a portion of the second vertical wall portion in a direction of thickness of the second vertical wall portion, such that an amount of deformation becomes greater on the second flange portion side than on the headwall portion side.

In this second aspect, the first vertical wall portion is formed extending from the edge portion on one side in the width direction of the plate-shaped headwall portion toward one side in the direction of thickness of the headwall portion, and the second vertical wall portion is formed extending from the other side in the width direction of the headwall portion toward one side in the direction of thickness of the headwall portion. Furthermore, the first flange portion is formed extending from the edge portion of the first vertical wall portion that is opposite the edge portion of the first vertical wall portion near the headwall portion, toward the outside in the width direction of the headwall portion, and the second flange portion is formed extending from the edge portion of the second vertical wall portion that is opposite the edge portion of the second vertical wall portion near the headwall portion, toward the outside in the width direction of the headwall portion. That is, the formed part is formed so that it has a hat-shaped cross-section that is open toward one side in the direction of thickness of the headwall portion. Such a formed part with a hat-shaped cross-section is more rigid than a structure in which only the first vertical wall portion and a first flange portion, or only the second vertical wall portion and the second flange portion, are formed on one side.

With the formed part having this structure, the edge portion in the width direction of the headwall portion on the side where the first vertical wall is formed is curved with the center of curvature being on one side in the width direction of the headwall portion (i.e., on the side on which the first vertical wall portion is formed). Moreover, the first vertical wall portion, is curved, with the center of curvature being on one side in the width direction of the headwall portion, along this edge portion on one side in the width direction of the headwall portion.

The first linear length difference absorbing portion is formed on the first vertical wall portion by bending or curving a portion of the first vertical wall portion in the direction of thickness of the first vertical wall portion. Moreover, this first linear length difference absorbing portion deforms more on the headwall portion side than it does on the first flange portion side. Therefore, it is formed on the edge portion on one side in the width direction of the headwall portion. Moreover, the linear length difference before and after forming of the formed part at the first vertical wall portion that is curved with the center of curvature being on one side in the width direction of the headwall portion, is effectively absorbed by the first linear length difference absorbing portion.

Meanwhile, the edge portion in the width direction of the headwall portion on the side where the second vertical wall portion is formed is also curved with the center of curvature being on one side in the width direction of the headwall portion (i.e., on the side where the first vertical wall portion is formed). Moreover, the second vertical wall portion is curved, with the center of curvature being on one side in the width direction of the headwall portion, along the edge portion on this other side in the width direction of the headwall portion.

The second linear length difference absorbing portion is formed on the second vertical wall portion by bending or curving a portion of the second vertical wall portion in the direction of thickness of the second vertical wall portion. Moreover, this second linear length difference absorbing portion deforms more on the second flange portion side than it does on the headwall portion side. Therefore, it is formed on the edge portion on the other side in the width direction of the headwall portion. Moreover, the linear length difference before and after forming of the formed part at the second vertical wall portion that is curved with the center of curvature being on one side in the width direction of the headwall portion, is effectively absorbed by the second linear length difference absorbing portion. In this way, with the formed part having this structure, the linear length difference before and after forming on both the first vertical wall portion side and the second vertical wall portion side can be prevented or effectively minimized, such that unnecessary deformation from a stress difference or the like caused by this linear length difference can be prevented or effectively minimized.

According to the second aspect, even though the formed part has a hat-shaped cross-section and the first and second vertical wall portions are formed in curved shapes such that the centers of curvature are on one side in the width direction of the headwall portion, it is still possible to prevent or effectively minimize unnecessary deformation from a stress difference or the like caused by this linear length difference.

In the foregoing aspect, a sectional shape of the formed part cut parallel to the width direction of the headwall portion may be generally hat shaped.

In the foregoing aspect, the edge portion on the second flange portion side of the second linear length difference absorbing portion may be positioned between the edge portions on the headwall portion side of two adjacent first linear length difference absorbing portions in the longitudinal direction.

In the foregoing aspect, the first linear length difference absorbing portion may be formed by bending a portion of the first vertical wall portion in the direction of thickness of the first vertical wall portion, and a bend line portion of the bend is linear. Also, the second linear length difference absorbing portion may be formed by bending a portion of the second vertical wall portion in the direction of thickness of the second vertical wall portion, and a bend line portion of the bend is linear.

In the foregoing aspect, the first vertical wall portion may form the first linear length difference absorbing portion by making the edge portion of the first vertical wall portion on the headwall portion side wavy, and the second vertical wall portion may form the second linear length difference absorbing portion by making the edge portion of the second vertical wall portion on the second flange portion side wavy.

In the foregoing aspect, the first linear length difference absorbing portion may extend from the edge portion of the first vertical wall portion on the headwall portion side toward the edge portion of the first vertical wall portion on the first flange portion side while slanting in the longitudinal direction, and the second linear length difference absorbing portion may extend from the edge portion of the second vertical wall portion on the headwall portion side toward the edge portion of the second vertical wall portion on the second flange portion side while slanting in the longitudinal direction. Also, the first linear length difference absorbing portion may extend from the edge portion of the first vertical wall portion on the headwall portion side toward the first flange portion side in the width direction of the first vertical wall portion, and the second linear length difference absorbing portion may extend from the edge portion of the second vertical wall portion on the headwall portion side toward the second flange portion side in the width direction of the second vertical wall portion.

In the foregoing aspect, a thickness of a portion of the first linear length difference absorbing portion that protrudes from the first vertical wall portion may be less than a thickness of the first vertical wall portion, and a thickness of a portion of the second linear length difference absorbing portion that protrudes from the second vertical wall portion may be less than a thickness of the second vertical wall portion. Also, the first vertical wall portion may include (i) a first step portion that is continuous with an edge portion of the first linear length difference absorbing portion which protrudes in the direction of thickness of the first vertical wall portion, and (ii) a first main body portion that is continuous with an edge portion of the first linear length difference absorbing portion which is opposite the edge portion that is continuous with the first step portion, and the first main body portion and the first step portion are continuous with one another in the longitudinal direction between respective thickness centerlines of the first step portion and of the first main body portion, in the direction of thickness of the first vertical wall portion. Further, the second vertical wall portion may include (a) a second step portion that is continuous with an edge portion of the second linear length difference absorbing portion which protrudes in a direction of thickness of the second vertical wall portion, and (b) a second main body portion that is continuous with an edge portion of the second linear length difference absorbing portion which is opposite the edge portion that is continuous with the second step portion, and the second main body portion and the second step portion are continuous with one another in the longitudinal direction between respective thickness centerlines of the second step portion and of the second main body portion in the direction of thickness of the second vertical wall portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 2:
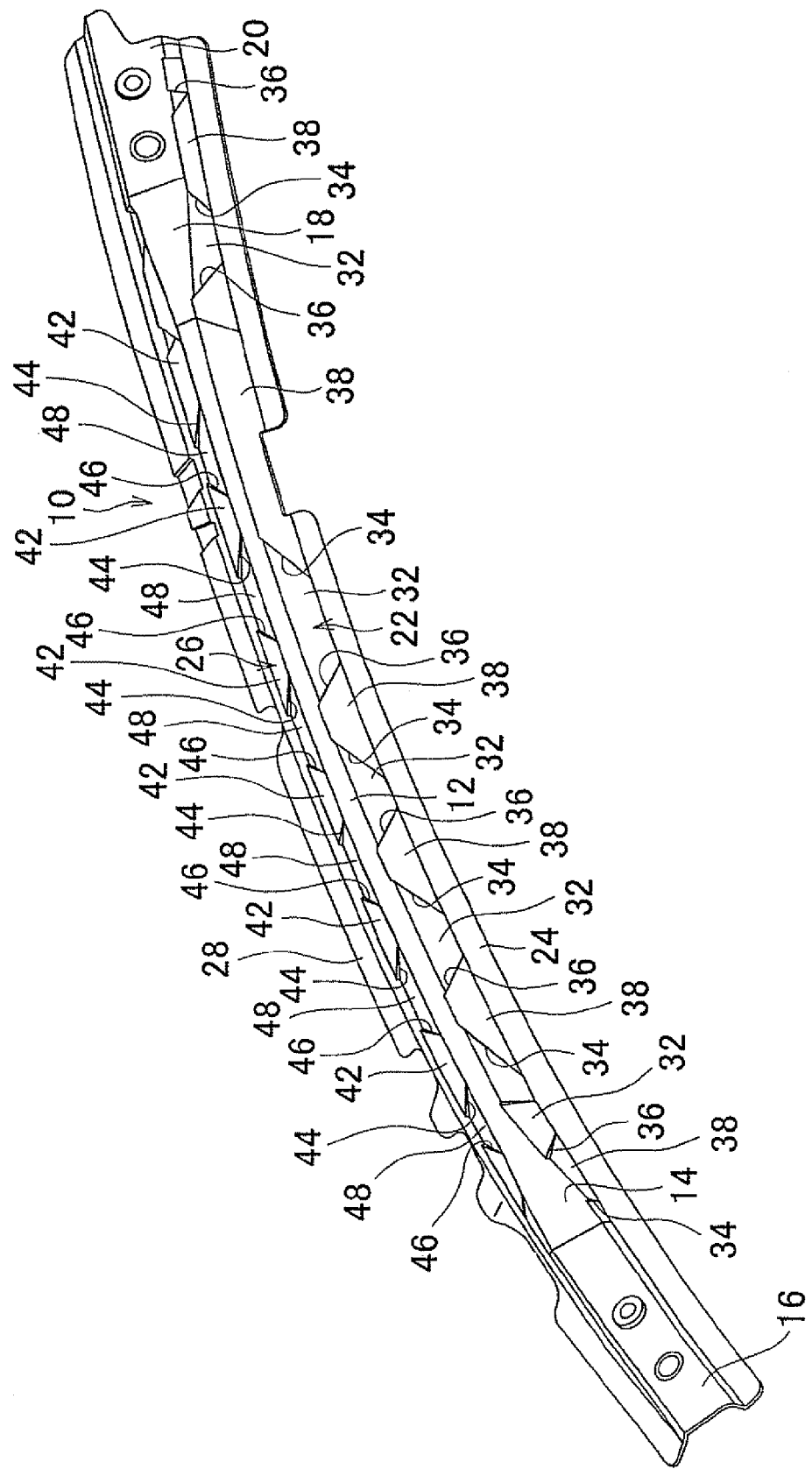
FIG. 2 is a perspective view of the formed part according to the example embodiment of the invention.
Figure 3:
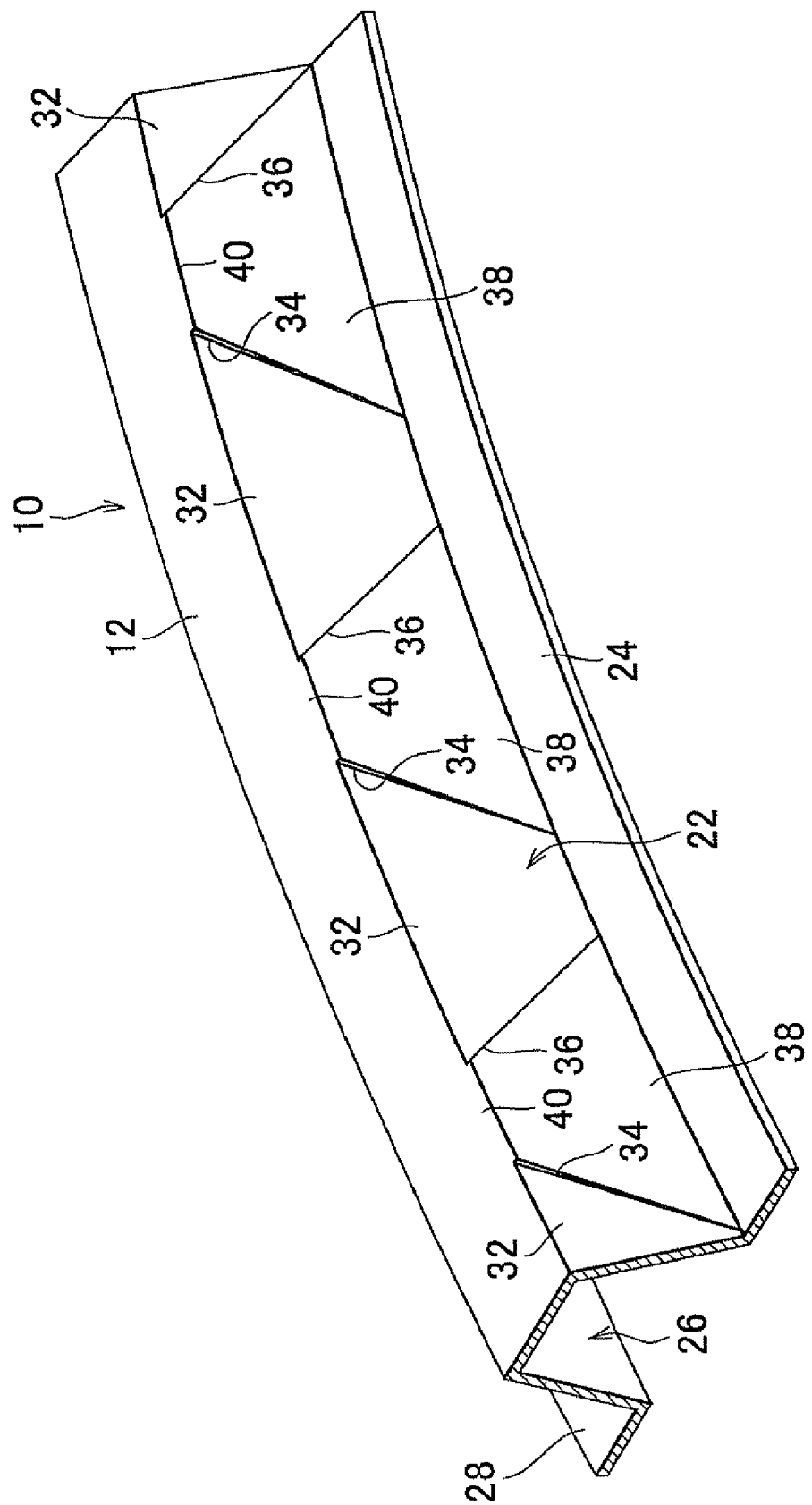
FIG. 3 is a perspective view schematically showing the main portions of the formed part according to the example embodiment of the invention, as viewed from the side on which the center of curvature of the curve is located.
Figure 4:
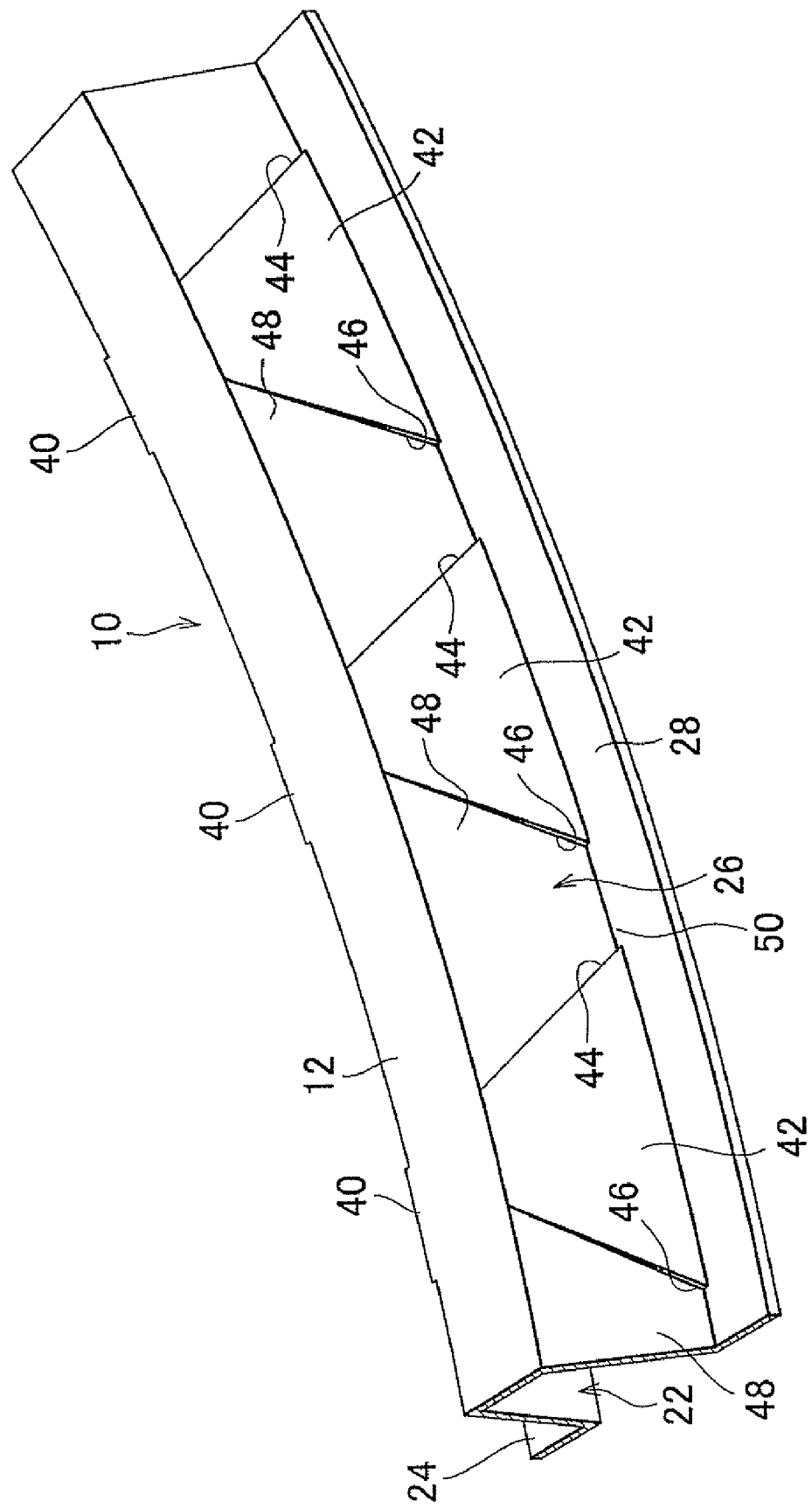
FIG. 4 is a perspective view schematically showing the main portions of the formed part according to the example embodiment of the invention, as viewed from the side opposite the side on which the center of curvature of the curve is located.

Example embodiments of the invention will hereinafter be described with reference to the accompanying drawings. First, the basic structure of a roof side rail outer reinforcement 10 will be described. FIG. 2 is a perspective view of the structure of the roof side rail outer reinforcement 10 serving as the formed part for a vehicle body structural member according to an example embodiment of the invention. Also, FIGS. 3 and 4 are perspective views each schematically showing the structure of the main portions of the roof side rail outer reinforcement 10. The actual roof side rail outer reinforcement 10 is shaped as shown in FIG. 2, but will be described mainly with reference to FIGS. 3 and 4 to facilitate understanding of the main points of this example embodiment.

As shown in the drawings, the roof side rail outer reinforcement 10 includes a headwall portion 12 as a first wall portion. This headwall portion 12 is formed in a plate shape, the longitudinal direction of which generally follows the longitudinal direction of the vehicle, and the direction of thickness of which generally follows the left-right direction of the vehicle (i.e., generally follows the width direction of the vehicle), because the roof side rail outer reinforcement 10 is mounted to the roof side of the vehicle. Also, the headwall portion 12 is curved following the shape of the roof side of the vehicle, with the center of curvature being on the side that is generally lower in the vehicle height direction, which is one side in the width direction of the headwall portion 12.

As shown in FIG. 2, a sloped portion 14 is formed continuing from the edge portion of the headwall portion 12 that is toward generally the front of the vehicle, from among the two edge portions in the longitudinal direction of the headwall portion 12. The sloped portion 14 is sloped such that the side opposite the side that continues from the headwall portion 12 is positioned generally on the outside in the vehicle width direction, and gradually becomes wider away from the side that continues from the headwall portion 12. A fixing portion 16 is formed continuing from the edge portion of the sloped portion 14 that is on the opposite side from the headwall portion 12. This fixing portion 16 is fixed to an upper end of a front pillar, or a frame member or reinforcing member or the like of the vehicle body.

Similarly, a sloped portion 18 is formed continuing on from the other edge portion in the longitudinal direction of the headwall portion 12 (i.e., the end of the headwall portion 12 that is positioned toward generally the rear of the vehicle). The sloped portion 18 is sloped such that the side opposite the side that continues from the headwall portion 12 is positioned generally on the outside in the vehicle width direction, and gradually becomes wider away from the side that continues from the headwall portion 12. A fixing portion 20 is formed continuing from the edge portion of the sloped portion 18 on the opposite side from the headwall portion 12. This fixing portion 20 is fixed to an upper end of a front pillar, or a frame member or reinforcing member or the like of the vehicle body.

Meanwhile, as shown in FIGS. 2 and 3, a first vertical wall portion 22, which is a second wall portion or a vertical wall portion, is formed continuing on from a first edge portion of the headwall portion 12, which is an edge portion on one side in the width direction of the headwall portion 12 (i.e., continuing on from the edge portion in the width direction of the headwall portion 12 on the side that is generally lower in the vehicle height direction, which is the edge portion on the side of the center of curvature, from among the two edge portions in the width direction of the headwall portion 12). This first vertical wall portion 22 is formed in a plate shape, the longitudinal direction of which follows the first edge portion in the width direction of the headwall portion 12, and the width direction of which generally follows the outside in the vehicle width direction (or more specifically, sloped generally downward in the vehicle height direction with respect to generally the outside in the vehicle width direction). A first flange portion 24, which is a third wall portion or flange portion, is formed continuing on from the edge portion of the first vertical wall portion 22 that is on the opposite side from the headwall portion 12 in the width direction of the first vertical wall portion 22. The first flange portion 24 is formed in a plate shape, the direction of thickness of which generally follows the direction of thickness of the headwall portion 12. The first flange portion 24 extends from an edge portion in the width direction of the first vertical wall portion 22 toward the outside in the width direction of the headwall portion 12.

Similarly, as shown in FIGS. 2 and 4, a second vertical wall portion 26, which is a second wall portion or a vertical wall portion, is formed continuing on from a second edge portion of the headwall portion 12, which is on the other side in the width direction of the headwall portion 12 from the first edge portion (i.e., continuing on from the edge portion in the width direction of the headwall portion 12 on the side that is generally higher in the vehicle height direction, which is the edge portion on the side opposite the center of curvature, from among the two edge portions in the width direction of the headwall portion 12). This second vertical wall portion 26 is formed in a plate shape, the longitudinal direction of which follows the second edge portion in the width direction of the headwall portion 12, and the width direction of which generally follows the outside in the vehicle width direction (more specifically, sloped generally upward in the vehicle height direction with respect to generally the outside in the vehicle width direction). A second flange portion 28, which is a third wall portion or flange portion, is formed continuing on from the edge portion of the second vertical wall portion 26 that is on the opposite side from the headwall portion 12 in the width direction of the second vertical wall portion 26. The second flange portion 28 is formed in a plate shape, the direction of thickness of which generally follows the direction of thickness of the headwall portion 12. The second flange portion 28 extends from an edge portion in the width direction of the second vertical wall portion 26 toward the outside in the width direction of the headwall portion 12.

Figure 5:
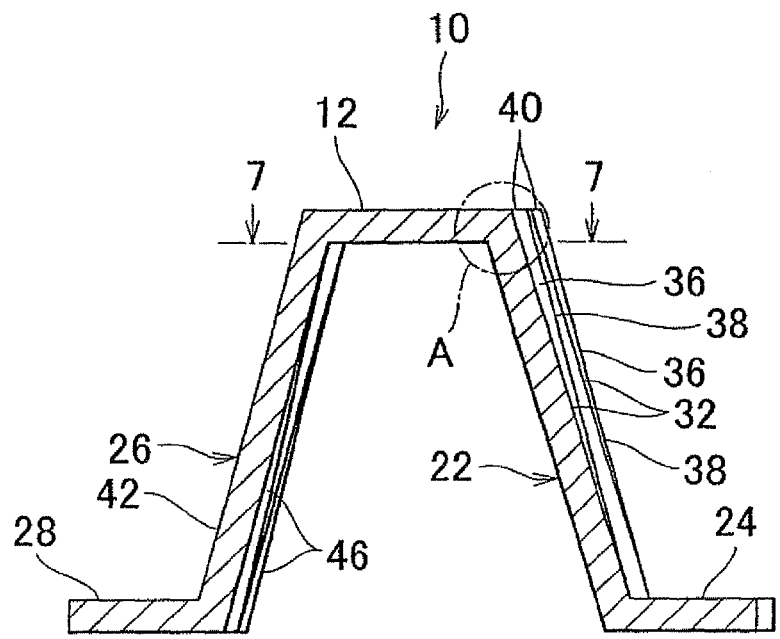
FIG. 5 is a sectional view taken along line 5-5 in FIG. 1.
Figure 6:
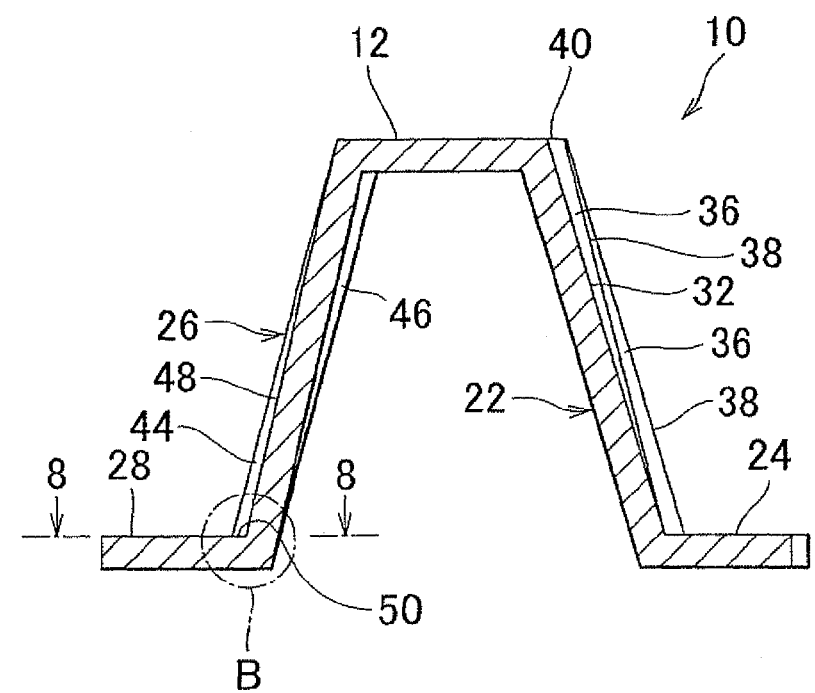
FIG. 6 is a sectional view taken along line 6-6 in FIG. 1.

Accordingly, the sectional shape of the roof side rail outer reinforcement 10 when cut orthogonal to the longitudinal direction of the headwall portion 12 is generally hat-shaped, as shown in FIGS. 5 and 6. This roof side rail outer reinforcement 10 is basically formed by drawing (press-forming) a flat sheet of steel, high strength steel, which has greater tensile strength than normal steel, or ultra high strength steel, which has even greater tensile strength than high strength steel.

Figure 1:
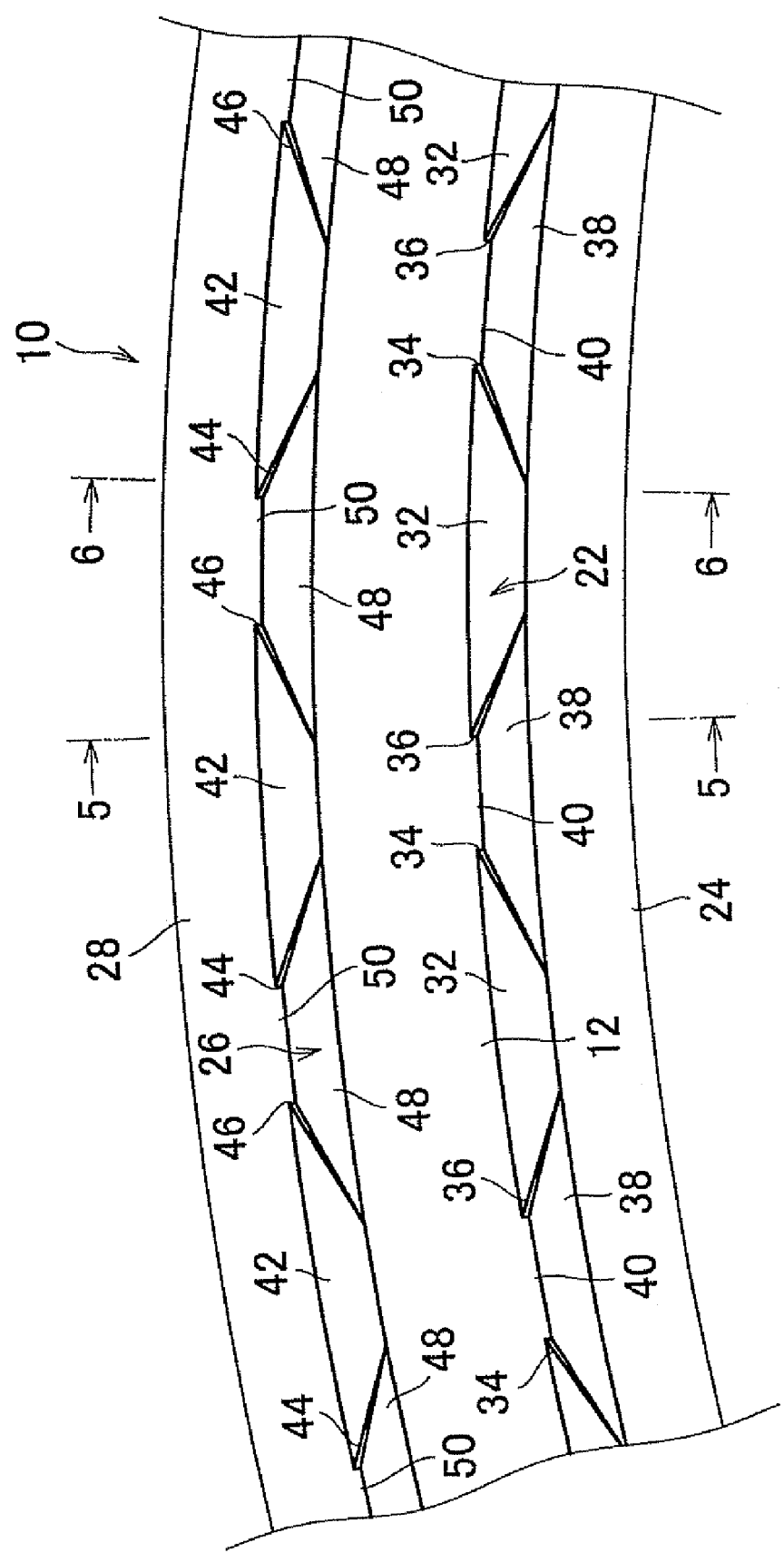
FIG. 1 is a plan view schematically showing the main portions of a formed part for a vehicle body structural member according to an example embodiment of the invention.

Next, the first vertical wall 22 and the second vertical wall 26 will be described in more detail. As shown in FIG. 1, and in more detail in FIG. 3, the first vertical wall 22 includes a vertical wall main body 32. A curved portion 34, which acts as a linear length difference absorbing portion or a first linear length difference absorbing portion, is formed on an edge portion of the vertical wall main body 32 on one side in the longitudinal direction of the first vertical wall portion 22. This curved portion 34 is formed by being bent from the edge portion of the vertical wall main body 32 toward the outside in the width direction of the headwall portion 12. A bend line portion which is the boundary between the curved portion 34 and the vertical wall main body 32 is linear. Moreover, the bend line portion between the curved portion 34 and the vertical wall main body 32 is slanted in the longitudinal direction of the first vertical wall portion 22 with respect to the width direction of the first vertical wall portion 22 such that the edge portion of this bend line portion on the first flange portion 24 side is closer to a first end side in the longitudinal direction of the first vertical wall portion 22 than the edge portion on the headwall portion 12 side.

Accordingly, the outer surface of the curved portion 34 is slanted in the longitudinal direction of the first vertical wall portion 22 toward the side with the headwall portion 12 in the width direction of the first vertical wall portion 22. Furthermore, the curved portion 34 protrudes toward the outside in the width direction of the headwall portion 12, protruding the most at the edge portion on the headwall portion 12 side, and protruding the least, if at all, at the edge portion on the first flange portion 24 side (i.e., the amount that the curved portion 34 protrudes from the vertical wall main body 32 toward the outside in the width direction of the headwall portion 12 gradually decreases toward the first flange portion 24 side). In this particular example embodiment, the edge portion on the first flange portion 24 side of the curved portion 34 does not protrude at all from the vertical wall main body 32. Therefore, the curved portion 34 when viewed from the front (i.e., the curved portion 34 when viewed in the longitudinal direction of the headwall portion 12) has a triangular shape with the apex being on the first flange portion 24 side.

Meanwhile, a curved portion 36, which acts as a linear length difference absorbing portion or a first linear length difference absorbing portion, is formed on the edge portion of the vertical wall main portion 32 on the other side in the longitudinal direction of the first vertical wall body 22. Similar to the curved portion 34, the curved portion 36 is formed by being bent from the edge portion of the vertical wall main body 32 toward the outside in the width direction of the headwall portion 12. Also, similar to the bend line portion of the curved portion 34, a bend line portion which is the boundary between the curved portion 36 and the vertical wall main body 32 is linear and slanted in the longitudinal direction of the first vertical wall portion 22 with respect to the width direction of the first vertical wall portion 22.

However, the bend line portion which is the boundary between the curved portion 36 and the vertical wall main body 32 differs from the bend line portion of the curved portion 34 in that the edge portion on the first flange portion 24 side is positioned closer to a second end side in the longitudinal direction of the first vertical wall portion 22 than the edge portion on the headwall portion 12 side. Accordingly, the outer surface of the curved portion 36 is slanted in the longitudinal direction of the first vertical wall portion 22 toward the side with the headwall portion 12 in the width direction of the first vertical wall portion 22. Furthermore, similar to the curved portion 34, the curved portion 36 protrudes toward the outside in the width direction of the headwall portion 12, protruding the most at the edge portion on the headwall portion 12 side, and protruding the least, if at all, at the edge portion on the first flange portion 24 side (i.e., the amount that the curved portion 36 protrudes from the vertical wall main body 32 toward the outside in the width direction of the headwall portion 12 gradually decreases toward the first flange portion 24 side).

In this particular example embodiment, the edge portion on the first flange portion 24 side of the curved portion 36 does not protrude at all from the vertical wall main body 32. Therefore, the curved portion 36 when viewed from the front (i.e., the curved portion 36 when viewed in the longitudinal direction of the headwall portion 12) has a triangular shape with the apex being on the first flange portion 24 side. In this particular embodiment, the amount and the like that the curved portion 36 protrudes from the vertical wall main body 32 is set such that the shape of the curved portion 36 when viewed from the front is generally the same as the shape of the curved portion 34 when viewed from the front.

Figure 7:
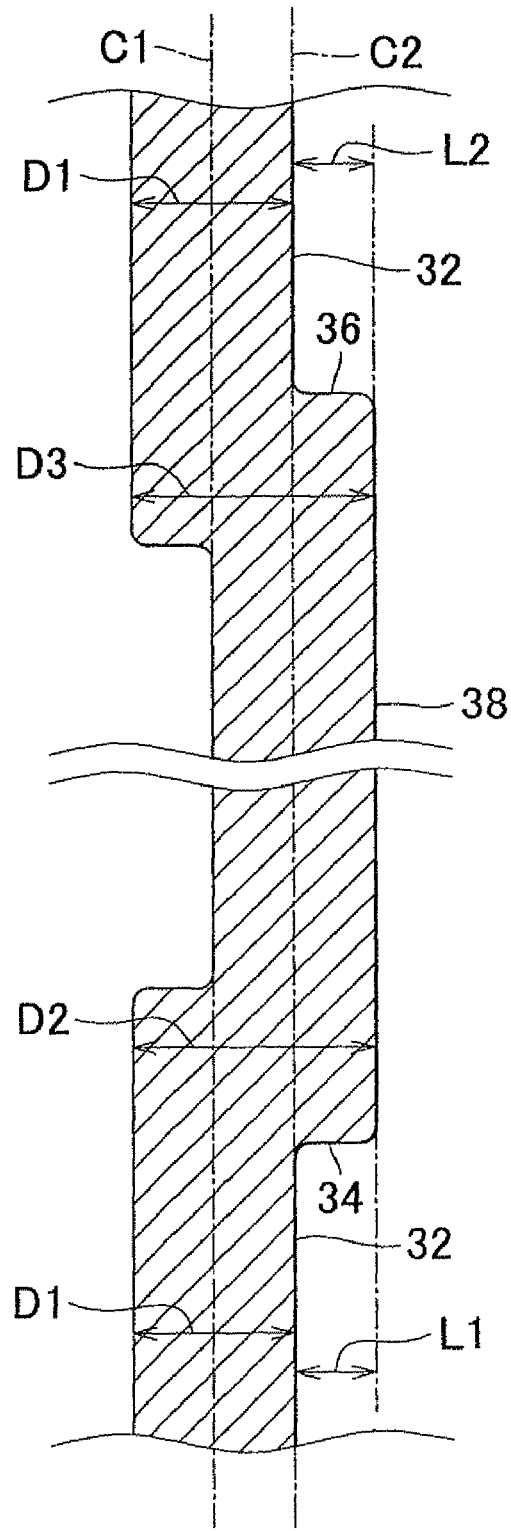
FIG. 7 is a general enlarged end view of the portion encircled by the alternate long and short dash line A taken along line 7-7 in FIG. 5.

As a result, a step portion 38 is formed between the edge portion of the curved portion 34 that is opposite the edge portion of the curved portion 34 that contacts the vertical wall main body 32, and the edge portion of the curved portion 36 that is opposite the edge portion of the curved portion 36 that contacts the vertical wall main body 32. The edge portions of the curved portions 34 and 36 that are opposite the edge portions of the curved portions 34 and 36 that contact the vertical wall main body 32 are connected by the step portion 38. FIG. 7 shows an enlarged end view of the boundary portion between the first vertical wall portion 22 and the headwall portion 12, which is encircled by the alternate long and short dash line A in FIG. 5. As shown in the drawing, a maximum protrusion amount L1 of the curved portion 34 from the vertical wall main body 32 is less than the thickness D1 of the vertical wall main portion 32. Preferably, the maximum protrusion amount L1 is no more than half of the thickness D1. Therefore, the thickness D2 of the first vertical wall portion 22 at the portion where the curved portion 34 is formed is less than twice the thickness D1 of the first vertical wall portion 22 at a portion where the vertical wall main body 32 or the step portion 38 is formed. Preferably, the thickness D2 is no more than 1.5 times the thickness D1.

Also, the maximum protrusion amount L2 of the curved portion 36 from the vertical wall main body 32 is less than the thickness D1 of the vertical wall main body 32. Preferably, the maximum protrusion amount L2 is no more than half the thickness D1. Therefore, the thickness D3 of the first vertical wall portion 22 at the portion where the curved portion 36 is formed is less than twice the thickness D1 of the first vertical wall portion 22 at a portion where the vertical wall main body 32 or the step portion 38 is formed. Preferably, the thickness D3 is no more than 1.5 times the thickness D1. Therefore, the surface of the step portion 38 that faces inward in the width direction of the headwall portion 12 (i.e., the left side surface of the step portion 38 in FIG. 7) is positioned farther to the inside in the width direction of the headwall portion 12 than the surface of the vertical wall main body 32 that faces outward in the width direction of the headwall portion 12 (i.e., the right side surface of the vertical wall main body 32 in FIG. 7), in the direction of thickness of the first vertical wall portion 22. As a result, the first vertical wall portion 22 is continuous in the longitudinal direction of the first vertical wall portion 22 between a thickness centerline C1 of the vertical wall main body 32 and a thickness centerline C2 of the step portion 38.

Moreover, in this example embodiment, the roof side rail outer reinforcement 10 is formed by drawing (i.e., press-forming) a flat sheet, as described above. However, when a structure without the curved portions 34 and 36 and the step portion 38 formed on the first vertical wall portion 22 is drawn (press-formed) from a flat sheet, the linear length at the boundary portion between the first vertical wall portion 22 and the headwall portion 12 changes during forming such that the linear length after forming is different than the linear length before forming (i.e., there is a difference S in the linear length before and after forming). In this example embodiment, the relationship among the number N1 of curved portions 34 of the roof side rail outer reinforcement 10, the number N2 of curved portions 36 of the roof side rail outer reinforcement 10, the protrusion amount L1 of the curved portion 34 from the vertical wall main body 32, the protrusion amount L2 of the curved portion 36 from the vertical wall main body 32, and the difference S in the linear length is as shown in Expression (1) below.

$$S=(N1 \times L1)+(N2 \times L2) \qquad (1)$$

In particular, if the number N1 of curved portions 34 of the roof side rail outer reinforcement 10 and the number N2 of curved portions 36 of the roof side rail outer reinforcement 10 are equal, and the protrusion amount L1 of the curved portion 34 from the vertical wall main body 32 and the protrusion amount L2 of the curved portion 36 from the vertical wall main body 32 are equal, Expression (1) can be rewritten as shown in Expression (2) below.

$$S=N \times L \qquad (2)$$

where N=N1+N2 and L=L1=L2. Moreover, as shown in FIGS. 1 and 3, a protruding portion 40 is formed on the edge portion on the first vertical wall portion 22 side of the headwall portion 12 by forming the curved portions 34 and 36 and the step portion 38 on the first vertical wall portion 22. This protruding portion 40 protrudes farther to the outside in the width direction of the headwall portion 12 than the edge portion on the first vertical wall portion 22 side of the headwall portion 12 at a portion where the protruding portion 40 is not formed. The curved portions 34 and 36 and the step portion 38 of the first vertical wall portion 22 are directly connected to the headwall portion 12 by this protruding portion 40 formed on the headwall portion 12.

Meanwhile, as shown in FIG. 1, and in more detail in FIG. 4, the second vertical wall portion 26 includes a vertical wall main body 42. A curved portion 44, which acts as a linear length difference absorbing portion or a second linear length difference absorbing portion, is formed on an edge portion of the vertical wall main body 42 on one side in the longitudinal direction of the second vertical wall portion 26. This curved portion 44 is formed by being bent from the edge portion of the vertical wall main body 42 toward the inside in the width direction of the headwall portion 12. A bend line portion which is the boundary between the curved portion 44 and the vertical wall main body 42 is linear. Moreover, the bend line portion between the curved portion 44 and the vertical wall main body 42 is slanted in the longitudinal direction of the second vertical wall portion 26 with respect to the width direction of the second vertical wall portion 26 such that the edge portion of this bend line portion on the second flange portion 28 side is closer to a first end side in the longitudinal direction of the second vertical wall portion 26 than the edge portion on the headwall portion 12 side.

Accordingly, the outer surface of the curved portion 44 is slanted in the longitudinal direction of the second vertical wall portion 26 toward the side with the headwall portion 12 in the width direction of the second vertical wall portion 26. Furthermore, the curved portion 44 protrudes toward the inside in the width direction of the headwall portion 12, protruding the most at the edge portion on the second flange portion 28 side, and protruding the least, if at all, at the edge portion on the headwall portion 12 side (i.e., the amount that the curved portion 44 protrudes from the vertical wall main body 42 toward the inside in the width direction of the headwall portion 12 gradually decreases toward the headwall portion 12 side). In this particular example embodiment, the edge portion on the headwall portion 12 side of the curved portion 44 does not protrude at all from the vertical wall main body 42. Therefore, the curved portion 44 when viewed from the front (i.e., the curved portion 44 when viewed in the longitudinal direction of the headwall portion 12) has a triangular shape with the apex being on the headwall portion 12 side.

Meanwhile, a curved portion 46, which acts as a linear length difference absorbing portion or a second linear length difference absorbing portion, is formed on an edge portion of the vertical wall main body 42 on the other side in the longitudinal direction of the second vertical wall portion 26. Similar to the curved portion 44, the curved portion 46 is formed by being bent from the edge portion of the vertical wall main body 42 toward the inside in the width direction of the headwall portion 12. Also, similar to the bend line portion of the curved portion 44, a bend line portion which is the boundary between the curved portion 46 and the vertical wall main body 42 is linear and slanted in the longitudinal direction of the second vertical wall portion 26 with respect to the width direction of the second vertical wall portion 26. However, the bend line portion which is the boundary between the curved portion 46 and the vertical wall main body 42 differs from the bend line portion of the curved portion 44 in that the edge portion on the second flange portion 28 side is positioned closer to a second end side in the longitudinal direction of the second vertical wall portion 26 than the edge portion on the headwall portion 12 side.

Accordingly, the outer surface of the curved portion 46 is slanted in the longitudinal direction of the second vertical wall portion 26 toward the side with the headwall portion 12 in the width direction of the second vertical wall portion 26. Furthermore, similar to the curved portion 44, the curved portion 46 protrudes toward the inside in the width direction of the headwall portion 12, protruding the most at the edge portion on the second flange portion 28 side, and protruding the least, if at all, at the edge portion on the headwall portion 12 side (i.e., the amount that the curved portion 46 protrudes from the vertical wall main body 42 toward the inside in the width direction of the headwall portion 12 gradually decreases toward the headwall portion 12 side). In this particular example embodiment, the edge portion on the headwall portion 12 side of the curved portion 46 does not protrude at all from the vertical wall main body 42. Therefore, the curved portion 46 when viewed from the front (i.e., the curved portion 46 when viewed in the longitudinal direction of the headwall portion 12) has a triangular shape with the apex being on the headwall portion 12 side. In this particular embodiment, the amount and the like that the curved portion 46 protrudes from the vertical wall main body 42 is set such that the shape of the curved portion 46 when viewed from the front is generally the same as the shape of the curved portion 44 when viewed from the front.

Moreover, as shown in FIG. 1, the curved portion 44 is formed corresponding to the curved portion 34 in the width direction of the headwall portion 12, and the curved portion 46 is formed corresponding to the curved portion 36 in the width direction of the headwall portion 12. Accordingly, the edge portion on the second flange portion 28 side of the curved portion 44 is positioned between the edge portion on the headwall portion 12 side of the curved portion 34 and the edge portion on the headwall portion 12 side of the curved portion 36 in the longitudinal direction of the headwall portion 12. Similarly, the edge portion on the second flange portion 28 side of the curved portion 46 is also positioned between the edge portion on the headwall portion 12 side of the curved portion 34 and the edge portion on the headwall portion 12 side of the curved portion 36 in the longitudinal direction of the headwall portion 12.

Incidentally, in addition, in this example embodiment, the curved portions 34, 36, 44, and 46, are formed with the curved portion 44 being formed corresponding to the curved portion 34 in the width direction of the headwall portion 12, and the curved portion 46 being formed corresponding to the curved portion 36 in the width direction of the headwall portion 12, as described above. However, the curved portion 44 does not always have to correspond to the curved portion 34 in the width direction of the headwall portion 12, and the curved portion 46 does not always have to correspond to the curved portion 36 in the width direction of the headwall portion 12. However, even if they do not correspond to each other in this way, it is still preferable to form the curved portions 34, 36, 44, and 46 in positions such that the edge portions on the second flange portion 28 side of the curved portions 44 and 46 are positioned between the edge portion on the headwall portion 12 side of the curved portion 34 and the edge portion on the headwall portion 12 side of the curved portion 36.

Figure 8:
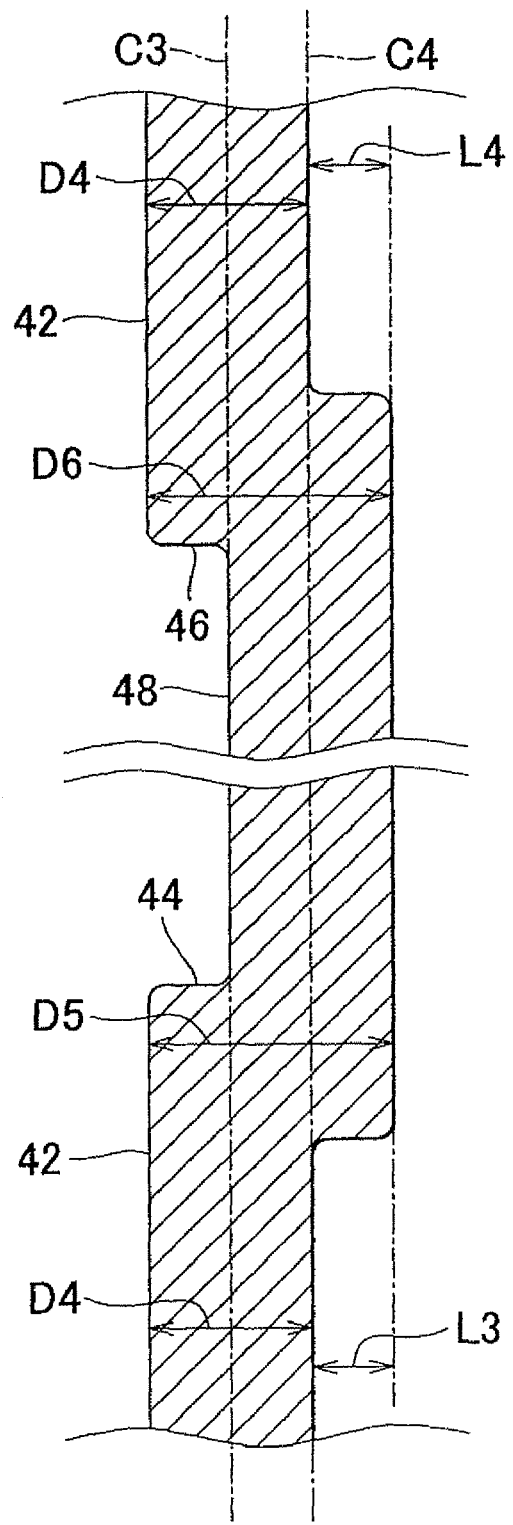
FIG. 8 is a general enlarged end view of the portion encircled by the alternate long and short dash line B taken along line 8-8 in FIG. 6.

Also, as shown in FIGS. 1 and 4, a step portion 48 is formed between the edge portion of the curved portion 44 that is opposite the edge portion of the curved portion 44 that contacts the vertical wall main body 42, and the edge portion of the curved portion 46 that is opposite the edge portion of the curved portion 46 that contacts the vertical wall main body 42. The edge portions of the curved portions 44 and 46 that are opposite the edge portions of the curved portions 44 and 46 that contact the vertical wall main body 42 are connected by the step portion 48. FIG. 8 shows an enlarged end view of the boundary portion between the second vertical wall portion 26 and the headwall portion 12, which is encircled by the alternate long and short dash line B in FIG. 6. As shown in the drawing, a maximum protrusion amount L3 of the curved portion 44 from the vertical wall main body 42 is less than the thickness D4 of the vertical wall main portion 42. Preferably, the maximum protrusion amount L3 is no more than half of the thickness D4. Therefore, the thickness D5 of the second vertical wall portion 26 at the portion where the curved portion 44 is formed is less than twice the thickness D4 of the second vertical wall portion 26 at a portion where the vertical wall main body 42 or the step portion 48 is formed. Preferably, the thickness D5 is no more than 1.5 times the thickness D4.

Also, the maximum protrusion amount L4 of the curved portion 46 from the vertical wall main body 42 is less than the thickness D4 of the vertical wall main body 42. Preferably, the maximum protrusion amount L4 is no more than half the thickness D4. Therefore, the thickness D6 of the second vertical wall portion 26 at the portion where the curved portion 46 is formed is less than twice the thickness D4 of the second vertical wall portion 26 at a portion where the vertical wall main body 42 or the step portion 48 is formed. Preferably, the thickness D6 is no more than 1.5 times the thickness D4. Therefore, the surface of the step portion 48 that faces outward in the width direction of the headwall portion 12 (i.e., the left side surface of the step portion 48 in FIG. 8) is positioned farther to the outside in the width direction of the headwall portion 12 than the surface of the vertical wall main body 42 that faces inward in the width direction of the headwall portion 12 (i.e., the right side surface of the vertical wall main body 42 in FIG. 8), in the direction of thickness of the second vertical wall portion 26. As a result, the second vertical wall portion 26 is continuous in the longitudinal direction of the second vertical wall portion 26, between a thickness centerline C3 of the vertical wall main body 42 and a thickness centerline C4 of the step portion 48.

Moreover, in this example embodiment, the roof side outer reinforcement 10 is formed by drawing (i.e., press-forming) a flat sheet, as described above. However, when a structure without the curved portions 44 and 46 and the step portion 48 formed in the second vertical wall portion 26 is drawn (press-formed) from a flat sheet, the linear length at the boundary portion between the second vertical wall portion 26 and the headwall portion 12 changes during forming such that the linear length after forming is different than the linear length before forming (i.e., there is a difference S in the linear length before and after forming). In this example embodiment, the relationship among the number N3 of curved portions 44 of the roof side rail outer reinforcement 10, the number N4 of curved portions 46 of the roof side rail outer reinforcement 10, the protrusion amount L3 of the curved portion 44 from the vertical wall main body 42, the protrusion amount L4 of the curved portion 46 from the vertical wall main body 42, and the difference S in the linear length is as shown in Expression (3) below.

$$S = (N3 \times L3) + (N4 \times L4) \quad (3)$$

In particular, if the number N3 of curved portions 44 of the roof side rail outer reinforcement 10 and the number N4 of curved portions 46 of the roof side rail outer reinforcement 10 are equal, and the protrusion amount L3 of the curved portion 44 from the vertical wall main body 42 and the protrusion amount L4 of the curved portion 46 from the vertical wall main body 42 are equal, Expression (3) can be rewritten as shown in Expression (4) below.

$$S = N \times L \quad (4)$$

where N=N3+N4 and L=L3=L4. Moreover, as shown in FIGS. 1 and 4, a protruding portion 50 is formed on the edge portion on the second vertical wall portion 26 side of the second flange portion 28 by forming the curved portions 44 and 46 and the step portion 48 on the second vertical wall portion 26. This protruding portion 50 protrudes farther to the inside in the width direction of the headwall portion 12 than the edge portion on the second vertical wall portion 26 side of the second flange portion 28 at a portion where the protruding portion 50 is not formed. The curved portions 44 and 46 and the step portion 48 of the second vertical wall portion 26 are directly connected to the second flange portion 28 by this protruding portion 50 formed on the second flange portion 28.

Hereinafter, the operation and effects of the example embodiment will be described. The roof side rail outer reinforcement 10 having the structure described above is formed by drawing (i.e., press-forming) a flat sheet, as described above. Typically, such press-forming is divided into two stages. During the first press, a flat sheet is formed into a shape having a hat-shaped cross-section. Then during the second press, the roof side rail outer reinforcement 10 is formed to precise dimensions. When forming the roof side rail outer, reinforcement 10 in this case, the curved portions 34, 36, 44, and 46, as well as the step portions 38 and 48, are all formed during the first press.

For example, in formed parts having a hat-shaped cross-section without the curved portions 34, 36, 44, and 46, and the step portions 38 and 48, i.e., in formed parts in which the first vertical wall portion 22 is formed by only the vertical wall main body 32 and the second vertical wall portion 26 is formed by only the vertical wall main body 42, and which are curved such that a center of curvature is positioned on one side in the width direction of the headwall portion 12 (or of a portion corresponding to the headwall portion 12 that makes up part of this roof side rail outer reinforcement 10), the linear length in the longitudinal direction of the headwall portion after forming ends up being different from the linear length in the longitudinal direction of the headwall portion before forming. This difference occurs because tensile stress is produced in the longitudinal direction of the headwall portion on one side in the width direction of the headwall portion (i.e., on the side where the center of curvature is located), and compression stress is produced in the longitudinal direction of the headwall portion on the other side in the width direction of the headwall portion (i.e., the side opposite the side where the center of curvature is located).

In this case, the roof side rail outer reinforcement 10 according to this example embodiment has the curved portions 34 and 36 formed on the first vertical wall portion 22. Therefore, the difference in linear length on the first vertical wall portion 22 side in the width direction of the headwall portion 12, i.e., the excessive or insufficient linear length after forming, is cancelled out by the sum of the amounts that the curved portions 34 and 36 protrude from the vertical wall main body 32. As a result, tensile stress on the first vertical wall portion 22 side that is caused by the difference in linear length described above can be prevented or effectively minimized. Also, by forming the curved portions 44 and 46 on the second vertical wall portion 26, the difference in linear length on the second vertical wall portion 26 side in the width direction of the headwall portion 12, i.e., the excessive or insufficient linear length after forming, is cancelled out by the sum of the amounts that the curved portions 44 and 46 protrude from the vertical wall main body 42. As a result, compression stress on the second vertical wall portion 26 side that is caused by the difference in linear length described above can be prevented or effectively minimized.

Preventing or effectively minimizing tensile strength on the first vertical wall portion 22 side and compression stress on the second vertical wall portion 26 side as described above makes it possible to prevent or effectively minimize unnecessary deformation such as twisting of the entire roof side rail outer reinforcement 10, in which the longitudinal direction of the headwall portion 12 is the axial direction, which is caused by such tensile stress and compression stress.

Also, even though it is possible to ascertain the extent of this difference in the linear length in advance, it has always been necessary to make countless design changes in the press dies to eliminate unnecessary deformation such as twisting. However, in this example embodiment, the extent to which the difference in linear length can be cancelled out (i.e., absorbed) can be very easily ascertained by the maximum amount that the curved portions 34 and 36 protrude from the vertical wall main body 32 and the combined number of curved portions 34 and 36 and step portions 38, and the maximum amount that the curved portions 44 and 46 protrude from the vertical wall main body 42 and the combined number of curved portions 44 and 46 and step portions 48. Accordingly, the number of design changes in press dies can be drastically reduced, thus greatly reducing development costs, which ultimately contributes to significant reductions in product cost.

Moreover, in this example embodiment, steps in the width direction of the headwall portion 12 are formed on the first vertical wall portion 22 and the second vertical wall portion 26 by forming the curved portions 34 and 36 and the step portion 38, and the curved portions 44 and 46 and the step portion 48. However, as described above, the first vertical wall portion 22 runs continuously in the longitudinal direction of the first vertical wall portion 22 between the thickness centerline C1 of the vertical wall main body 32 and the thickness centerline C2 of the step portion 38, and the second vertical wall portion 26 runs continuously in the longitudinal direction of the second vertical wall portion 26 between the thickness centerline C3 of the vertical wall main body 42 and the thickness centerline C4 of the step portion 48.

Therefore, even if the curved portions 34 and 36 and the step portion 38, and the curved portions 44 and 46, and the step portion 48 are formed, it is possible to ensure the mechanical strength and rigidity of the roof side rail outer reinforcement 10 in the longitudinal direction of the roof side rail outer reinforcement 10. Furthermore, a load input to the roof side rail outer reinforcement 10 from one side (i.e., either generally the vehicle front side or generally the vehicle rear side) can be transmitted to the edge portion of the roof side rail outer reinforcement 10 on the other side (i.e., generally the vehicle rear side or the generally vehicle front side).

Figure 9:
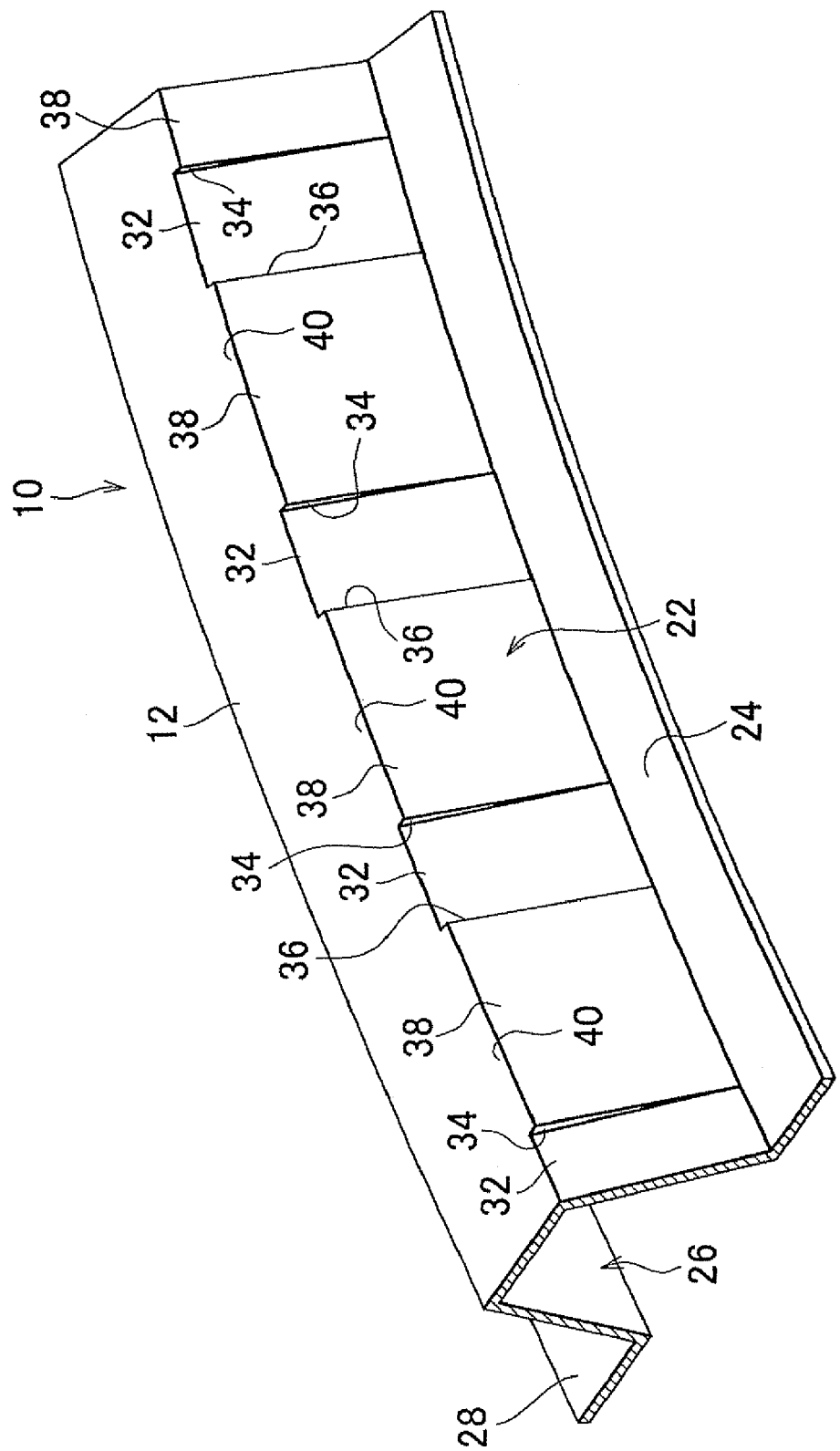
FIG. 9 is a perspective view corresponding to FIG. 3, showing a modified example of the formed part according to the example embodiment of the invention.
Figure 10:
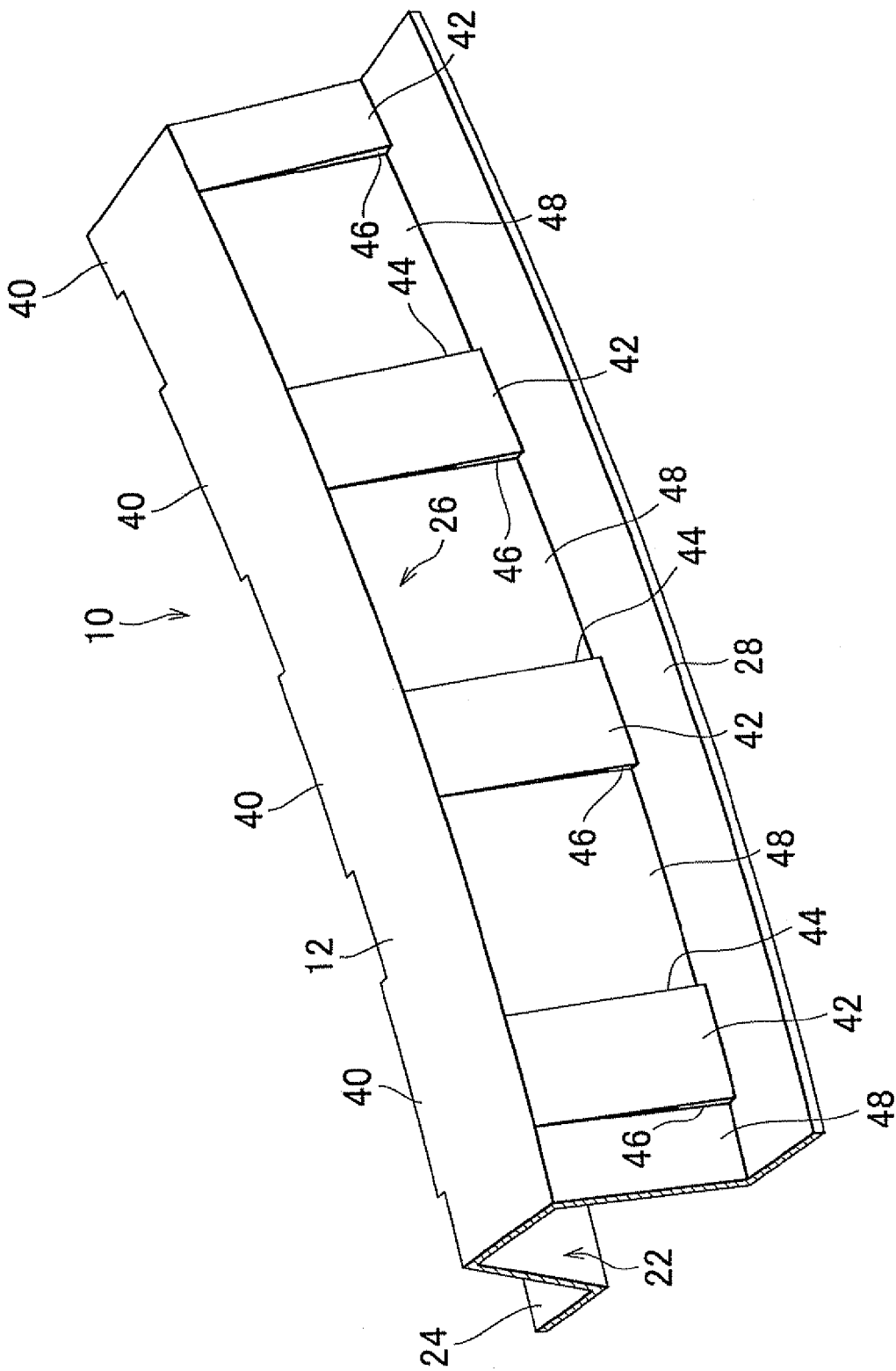
FIG. 10 is a perspective view corresponding to FIG. 4, showing the modified example of the formed part according to the example embodiment of the invention.

Incidentally, in this example embodiment, the curved portions 34 and 36 are slanted in the longitudinal direction of the first vertical wall portion 22 with respect to the width direction of the first vertical wall portion 22. Similarly, the curved portions 44 and 46 are slanted in the longitudinal direction of the second vertical wall portion 26 with respect to the width direction of the second vertical wall portion 26. However, as shown in FIGS. 9 and 10, for example, the curved portions 34 and 36 may extend in the width direction of the first vertical wall portion 22, and the curved portions 44 and 46 may extend in the width direction of the second vertical wall portion 26. With this kind of structure as well, it is preferable to form the curved portions 34, 36, 44, and 46 in positions such that the curved portions 44 and 46 are between the curved portion 34 and the curved portion 36.

Figure 11:
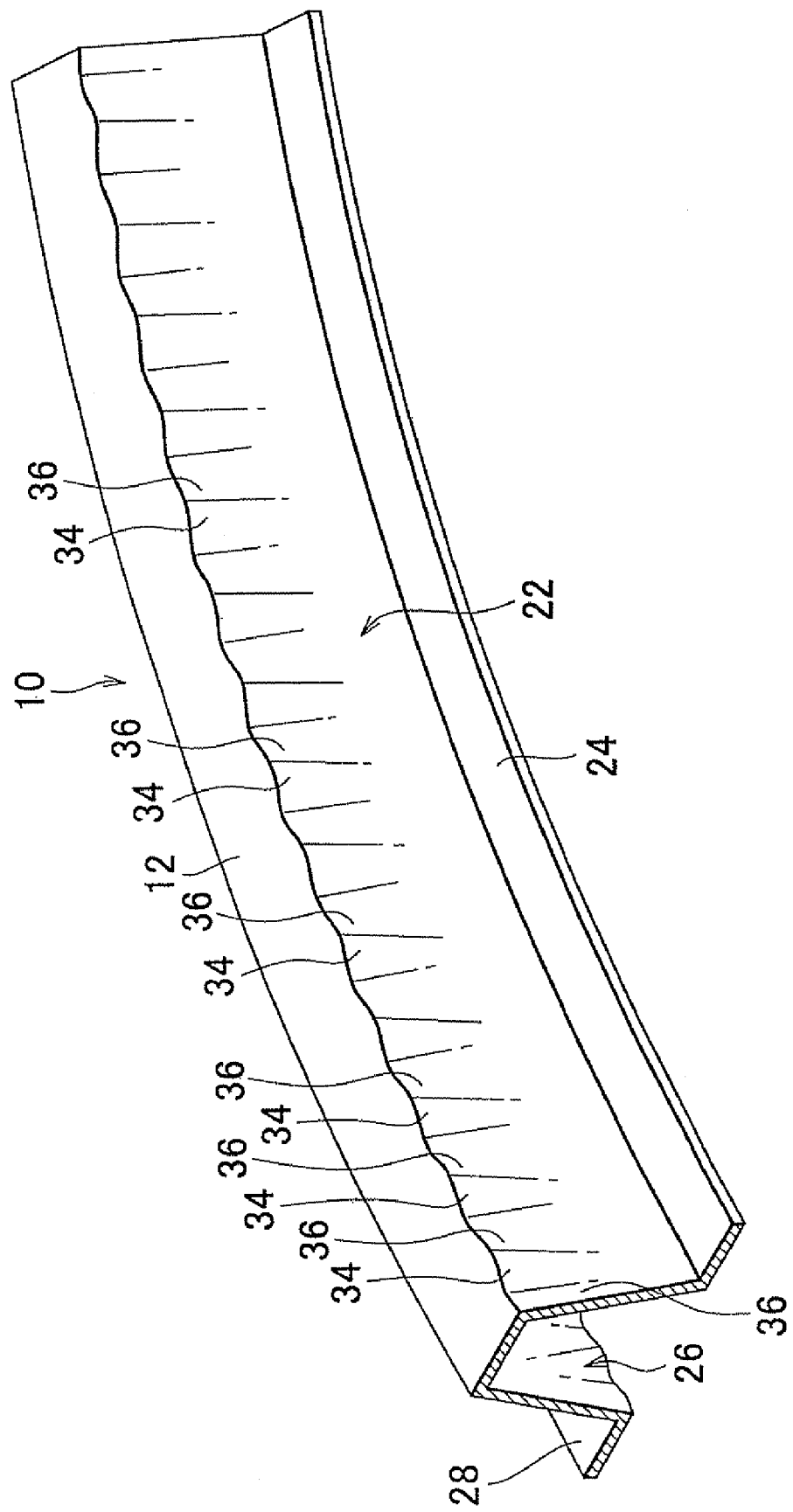
FIG. 11 is a perspective view corresponding to FIG. 3, showing another modified example of the formed part according to the example embodiment of the invention.
Figure 12:
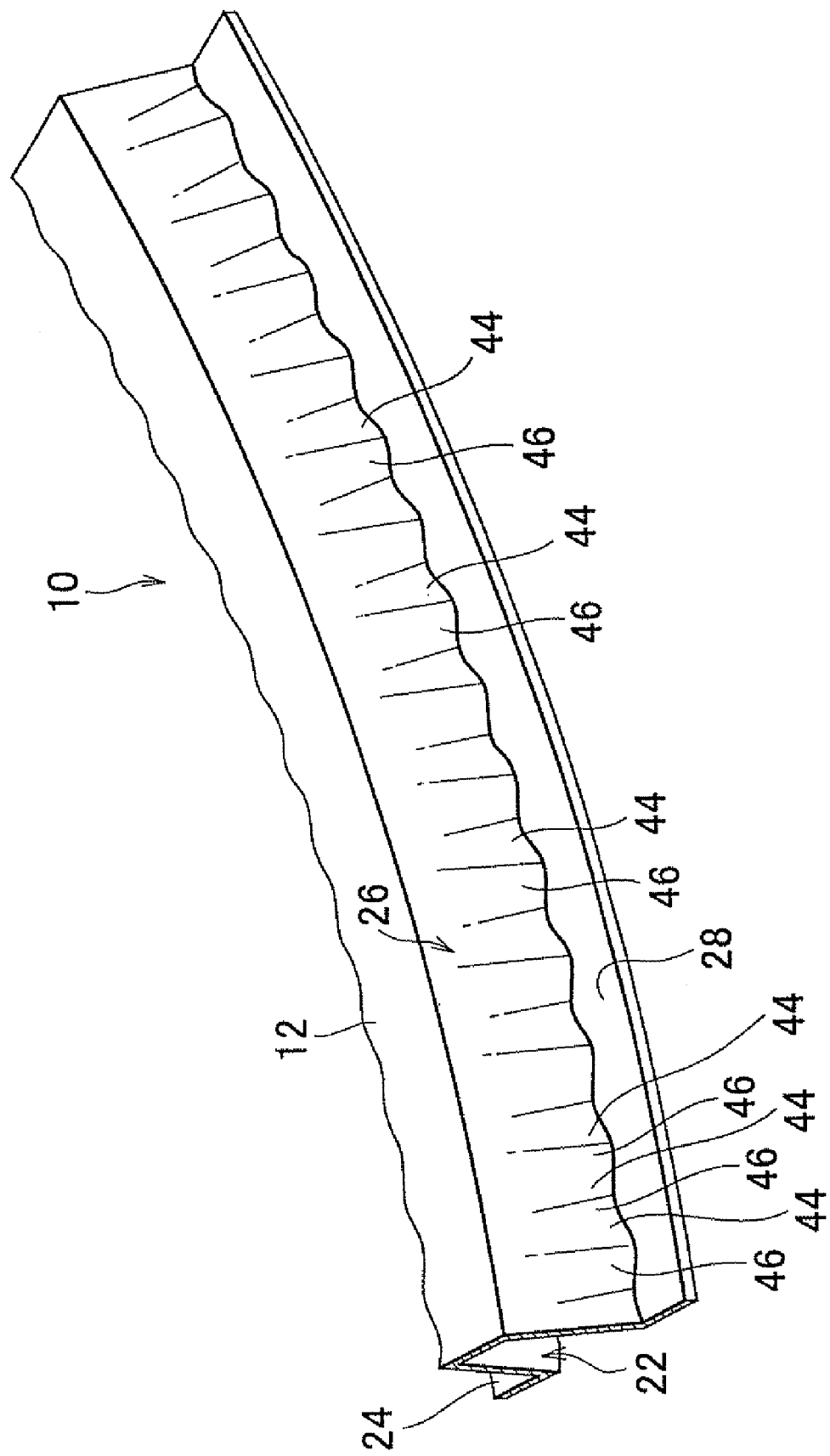
FIG. 12 is a perspective view corresponding to FIG. 4, showing the other modified example of the formed part according to the example embodiment of the invention.

Moreover, in the foregoing example embodiment, the vertical wall main body 32, the curved portion 34, the step portion 38, and the curved portion 36 together make up the first vertical wall portion 22. Similarly, the vertical wall main body 42, the curved portion 44, the step portion 48, and the curved portion 46 together make up the second vertical wall portion 26. However, the vertical wall main body 32 and/or the step portion 38 may be omitted from the first vertical wall portion 22. Similarly, the vertical wall main body 42 and/or the step portion 48 may be omitted from the second vertical wall portion 26. Examples of these are shown in FIGS. 11 and 12.

The structures shown in these drawings are such that the edge portion on the headwall portion 12 side of the first vertical wall portion 22 is wavy, as is the edge portion on the second flange portion 28 side of the second vertical wall portion 26. As a result, the first vertical wall portion 22 is formed by the curved portion 34 and the curved portion 36, and the second vertical wall portion 26 is formed by the curved portion 44 and the curved portion 46. With this kind of structure, the combined number of curved portions 34 and 36, as well as the combined number of curved portions 44 and 46 can be set higher than is possible with a structure having the vertical wall main bodies 32 and 42 and the step portions 38 and 48. As a result, a large difference in linear length can be cancelled out (i.e., absorbed) even if the amount that the curved portions 34, 36, 44, and 46 protrude in the width direction of the headwall portion 12 is relatively small.

Also, in the foregoing example embodiment, the invention is applied to the roof side rail outer reinforcement 10. However, the invention also may be applied to another vehicle body structural member (i.e., formed part for a vehicle body structural member) other than the roof side rail outer reinforcement 10, such as a frame member or a reinforcing member of a vehicle body.

Further, in the example embodiment described above, the sectional shape of the roof side rail outer reinforcement 10 is generally hat-shaped. However, the sectional shape to which the invention can be applied is not strictly limited to being hat-shaped. That is, as long as the shape is such that there is a difference in the linear length before and after forming as described above, that difference can be cancelled out (i.e., absorbed) by applying the invention, and various effects from canceling out (i.e., absorbing) that difference, as well as the effects of the example embodiment described above can be obtained.

Also, in the example embodiment described above, the material of which the roof side rail outer reinforcement 10 is made is not particularly limited. That is, as described above, a flat sheet of steel, high strength steel having greater tensile strength than that of typical steel, or ultra high strength steel having even greater tensile strength than that of high strength steel may be used as the material from which the roof side rail outer reinforcement 10 is made. However, the particular structure of the foregoing example embodiment, and thus the particular structure of the invention, is such that better effects are obtained with material having greater tensile strength.

The invention claimed is:

1. A formed part for a vehicle body structural member comprising:
    a first wall portion extending in a longitudinal direction and in a width direction orthogonal to the longitudinal direction and having two edge portions on opposite sides of the first wall portion in the width direction, at least one of the edge portions is curved such that a center of curvature of the edge portion is positioned on a first side in the width direction;
    a second wall portion formed so as to i) extend from the at least one edge portion of the first wall portion toward one side in a direction of thickness of the first wall portion, and ii) curve along with the edge portion in the width direction of the first wall portion;
    a third wall portion which extends from an edge portion of the second wall portion that is opposite the edge portion of the second wall portion which is continuous with the first wall portion, toward an outside in the width direction of the first wall portion; and
    a linear length difference absorbing portion which is formed on the second wall portion by bending or curving a portion of the second wall portion in a direction of thickness of the second wall portion; wherein
    the linear length difference absorbing portion includes at least one edge position of the second wall portion in the width direction, and,
    a height of the linear length difference absorbing portion is zero at the third wall portion or the first wall portion, and the height increases as the linear length difference absorbing portion extends away from the third wall portion or the first wall portion.

2. The formed part according to claim 1, wherein the second wall portion is at least one of a pair of vertical wall portions extend from the two edge portions of the first wall portion toward one side in the direction of thickness of the first wall portion, and on which a flange portion is formed extending from the edge portion of the second wall portion that is opposite the edge portion that is continuous with the first wall portion; the third wall portion being the flange portion.

3. The formed part according to claim 1, wherein the edge portion on the first side in the width direction of the first wall portion is curved such that a center of curvature of the edge portion is positioned on the first side in the width direction of the first wall portion, and an amount of deformation in the linear length difference absorbing portion in the direction of thickness of the second wall portion is made greater on the first wall portion side of the second wall portion than on the third wall portion side of the second wall portion.

4. The formed part according to claim 1, wherein the edge portion on the second side in the width direction of the first wall portion is curved such that a center of curvature of the edge portion is positioned on the first side in the width direction of the first wall portion, and an amount of deformation in the linear length difference absorbing portion in the direction of thickness of the second wall portion is made greater on the third wall portion side of the second wall portion than on the first wall portion side of the second wall portion.

5. The formed part according to claim 1, wherein the linear length difference absorbing portion is formed by bending a portion of the second wall portion in the direction of thickness of the second wall portion, and a bend line portion of the bend is linear.

6. The formed part according to claim 1, wherein the second wall portion forms the linear length difference absorbing portion by making the edge portion side of the first wall portion wavy.

7. The formed part according to claim 1, wherein the linear length difference absorbing portion extends from the edge portion of the second wall portion on the first wall portion side toward the edge portion of the second wall portion on the third wall portion side, while slanting in the longitudinal direction of the second wall portion.

8. The formed part according to claim 1, wherein the linear length difference absorbing portion extends from the edge portion of the second wall portion on the first wall portion side toward the edge portion of the second wall portion on the third wall portion side in the width direction of the second wall portion.

9. The formed part according to claim 1, wherein a thickness of a portion of the linear length difference absorbing portion that protrudes from the second wall portion is less than the thickness of the second wall portion.

10. The formed part according to claim 1, wherein the second wall portion includes i) a step portion that is continuous with an edge portion of the linear length difference absorbing portion which protrudes in the direction of thickness of the second wall portion, and ii) a main body portion that is continuous with an edge portion of the linear length difference absorbing portion which is opposite the edge portion that is continuous with the step portion; and the main body portion and the step portion are continuous with one another in the longitudinal direction between respective thickness centerlines of the main body portion and of the step portion, in the direction of thickness of the second wall portion.

11. A formed part for a vehicle body structural member comprising:
    a headwall portion extending in a longitudinal direction and in a width direction orthogonal to the longitudinal direction and having a first edge portion on one side in the width direction which is curved such that a center of curvature of the first edge portion is positioned on a first side in the width direction;
    a first vertical wall portion formed so as to i) extend from the first edge portion toward one side in a direction of thickness of the headwall portion, and ii) curve, with a center of curvature positioned on the first side in the width direction of the headwall portion, along with the first edge portion;
    a first flange portion that extends from an edge portion of the first vertical wall portion which is opposite an edge portion of the first vertical wall portion which is continuous with the headwall portion, toward an outside in the width direction of the headwall portion;

a second vertical wall portion formed so as to i) extend from a second edge portion on a second side in the width direction of the headwall portion toward one side in the direction of thickness of the headwall portion, and ii) curve, with a center of curvature positioned on the first side in the width direction of the headwall portion, along with the second edge portion;

a second flange portion that extends from an edge portion of the second vertical wall portion which is opposite an edge portion of the second vertical wall portion which is continuous with the headwall portion, toward an outside in the width direction of the headwall portion;

a first linear length difference absorbing portion which is formed on the first vertical wall portion by bending or curving a portion of the first vertical wall portion in a direction of thickness of the first vertical wall portion, such that an amount of deformation becomes greater on the headwall portion side than on the first flange portion side; and a second linear length difference absorbing portion which is formed on the second vertical wall portion by bending or curving a portion of the second vertical wall portion in a direction of thickness of the second vertical wall portion, such that an amount of deformation becomes greater on the second flange portion side than on the headwall portion side.

12. The formed part according to claim 11, wherein a sectional shape of the formed part cut parallel to the width direction of the headwall portion is generally hat-shaped.

13. The formed part according to claim 11, wherein an edge portion on the second flange portion side of the second linear length difference absorbing portion is positioned between edge portions on the headwall portion side of two adjacent first linear length difference absorbing portions in the longitudinal direction.

14. The formed part according to claim 11, wherein the first linear length difference absorbing portion is formed by bending a portion of the first vertical wall portion in the direction of thickness of the first vertical wall portion, and a bend line portion of the bend is linear; and the second linear length difference absorbing portion is formed by bending a portion of the second vertical wall portion in the direction of thickness of the second vertical wall portion, and a bend line portion of the bend is linear.

15. The formed part according to claim 11, wherein the first vertical wall portion forms the first linear length difference absorbing portion by making the edge portion of the first vertical wall portion on the headwall portion side wavy, and the second vertical wall portion forms the second linear length difference absorbing portion by making the edge portion of the second vertical wall portion on the second flange portion side wavy.

16. The formed part according to claim 11, wherein the first linear length difference absorbing portion extends from the edge portion of the first vertical wall portion on the headwall portion side toward the edge portion of the first vertical wall portion on the first flange portion side while slanting in the longitudinal direction, and the second linear length difference absorbing portion extends from the edge portion of the second vertical wall portion on the headwall portion side toward the edge portion of the second vertical wall portion on the second flange portion side while slanting in the longitudinal direction.

17. The formed part according to claim 11, wherein the first linear length difference absorbing portion extends from the edge portion of the first vertical wall portion on the headwall portion side toward the first flange portion side in the width direction of the first vertical wall portion, and the second linear length difference absorbing portion extends from the edge portion of the second vertical wall portion on the headwall portion side toward the second flange portion side in the width direction of the second vertical wall portion.

18. The formed part according to claim 11, wherein a thickness of a portion of the first linear length difference absorbing portion that protrudes from the first vertical wall portion is less than the thickness of the first vertical wall portion, and a thickness of a portion of the second linear length difference absorbing portion that protrudes from the second vertical wall portion is less than the thickness of the second vertical wall portion.

19. The formed part according to claim 11, wherein
the first vertical wall portion includes (i) a first step portion that is continuous with an edge portion of the first linear length difference absorbing portion which protrudes in the direction of thickness of the first vertical wall portion, and (ii) a first main body portion that is continuous with an edge portion of the first linear length difference absorbing portion which is opposite the edge portion that is continuous with the first step portion, and the first main body portion and the first step portion are continuous with one another in the longitudinal direction between respective thickness centerlines of the first step portion and of the first main body portion, in the direction of thickness of the first vertical wall portion; and
the second vertical wall portion includes (a) a second step portion that is continuous with an edge portion of the second linear length difference absorbing portion which protrudes in a direction of thickness of the second vertical wall portion, and (b) a second main body portion that is continuous with an edge portion of the second linear length difference absorbing portion which is opposite the edge portion that is continuous with the second step portion, and the second main body portion and the second step portion are continuous with one another in the longitudinal direction between respective thickness centerlines of the second step portion and of the second main body portion in the direction of thickness of the second vertical wall portion.

20. A formed part for a vehicle body structural member comprising:
a first wall portion extending in a longitudinal direction and in a width direction orthogonal to the longitudinal direction and having two edge portions on opposite sides of the first wall portion in the width direction, at least one of the edge portions is curved such that a center of curvature of the edge portion is positioned on a first side in the width direction;
a second wall portion formed so as to i) extend from the at least one edge portion of the first wall portion toward one side in a direction of thickness of the first wall portion, and ii) curve along with the edge portion in the width direction of the first wall portion;
a third wall portion which extends from an edge portion of the second wall portion that is opposite the edge portion of the second wall portion which is continuous with the first wall portion, toward an outside in the width direction of the first wall portion; and a linear length difference absorbing portion which is formed on the second wall portion by bending or curving a portion of the second wall portion in a direction of thickness of the second wall portion such that an amount of deformation becomes greater on the first wall portion side than on the third wall portion side, or the amount of deformation becomes greater on the third wall portion side than on the first wall portion side.

* * * * *